US010278538B2

(12) United States Patent
Cammon

(10) Patent No.: US 10,278,538 B2
(45) Date of Patent: May 7, 2019

(54) REMOVABLE PAN FOR COOKING GRILL

(71) Applicant: Dwayne Vaughn Cammon, Lathrup Village, MI (US)

(72) Inventor: Dwayne Vaughn Cammon, Lathrup Village, MI (US)

(*) Notice: Subject to any disclaimer, the term of this patent is extended or adjusted under 35 U.S.C. 154(b) by 468 days.

(21) Appl. No.: 14/299,253

(22) Filed: Jun. 9, 2014

(65) Prior Publication Data
US 2014/0360385 A1 Dec. 11, 2014

Related U.S. Application Data

(60) Provisional application No. 61/833,201, filed on Jun. 10, 2013.

(51) Int. Cl.
*A47J 37/07* (2006.01)
(52) U.S. Cl.
CPC ....... *A47J 37/0786* (2013.01); *A47J 37/0704* (2013.01); *Y10T 29/49716* (2015.01)
(58) Field of Classification Search
CPC .............. A47J 37/0786; A47J 37/0704
USPC ............... 99/444, 445, 446, 447, 448, 450; 126/345, 348, 369, 376.1, 377.1
See application file for complete search history.

(56) References Cited

U.S. PATENT DOCUMENTS

| 6,189,528 | B1 * | 2/2001 | Oliver | A47J 37/0704 126/25 R |
| 7,832,330 | B1 * | 11/2010 | Thompson | A47J 37/0704 126/163 R |
| 2004/0200359 | A1 * | 10/2004 | Snider | A47J 27/04 99/446 |
| 2007/0199555 | A1 * | 8/2007 | Gregory | F24C 1/16 126/9 R |
| 2008/0163765 | A1 * | 7/2008 | O'Shea | A47J 37/0713 99/482 |
| 2011/0070345 | A1 * | 3/2011 | Groll | A23L 5/15 426/281 |
| 2012/0255538 | A1 * | 10/2012 | Merritt | A47J 37/06 126/25 R |

* cited by examiner

*Primary Examiner* — Ibrahime A Abraham
*Assistant Examiner* — Justin C Dodson
(74) *Attorney, Agent, or Firm* — Oppenhuizen Law PLC; David L. Oppenhuizen

(57) ABSTRACT

A removable pan used to adapt a cooking grill to a meat smoker. The pan can be placed into a conventional backyard cooking grill to convert the grill into a meat smoker. The pan has a central section, a raised perimeter, and at least three tabs extending outwardly from a center of the pan. The tabs can be positioned on the horizontal surface that supports the cooking grate of the grill. The cooking grate is then positioned atop the pan. The pan functions as a heat sink and provides indirect heating. The pan can also optionally be filled with a liquid like water for additional temperature control and to affect the humidity within the grill. The presence of the liquid can impact the moisture and flavor profile of the meat being smoked.

6 Claims, 6 Drawing Sheets

REMOVABLE PAN FOR COOKING GRILL

CROSS REFERENCE TO RELATED APPLICATION

This application claims the benefit of U.S. Provisional Application 61/833,201, which was filed on Jun. 10, 2013, the disclosure of which is hereby incorporated by reference.

BACKGROUND OF THE INVENTION

1. Field of the Invention

The present invention pertains to a removable pan for use with a cooking grill. More particularly, the present invention pertains to a removable pan for use with a cooking grill that converts a grill into a meat smoker.

2. Description of the Prior Art

Meat smokers are well-known and commercially available. However, meat smokers can be expensive to purchase, they can require a fair amount of storage space, and they are a specialized food preparation tool that the average consumer would likely not purchase.

Smoking meats for extended periods of time, such as for three hours or more, has grown in popularity. Smoking meats requires a significantly extended cooking time, and it also requires lower cooking temperatures in the range of 250° F. or less. An ordinary backyard grill—whether charcoal or gas—is not well-suited for use as a smoker. The typical backyard grill is designed to cook meat in 5-25 minutes (depending upon the type and cut of the meat) at temperatures that can approach 500° F. Even more so, a typical backyard grill applies direct heat to the meat, which is detrimental to smoking meat for long periods of time. Nonetheless, most entry-level meat smokers use their ordinary backyard grill for smoking meat because they have no other option, and they are not prepared to purchase a complete meat smoker before even smoking meat for the first time. Therefore, many entry-level meat smokers use a kettle-style charcoal grill, and they may use only a small number of briquettes in order to keep the temperature down. But this approach requires constant monitoring over many hours, and it still can expose the meat to direct heat.

Thus, there remains a need to quickly, easily, and economically adapt an ordinary grill into one that is much better suited for smoking meat.

The present invention, as is detailed hereinbelow, seeks to fill this need by providing a removable pan, or heat diffuser, for use with a kettle grill that is placed between the meat and the heat source.

SUMMARY OF THE INVENTION

The present invention provides a heat diffuser for use with a kettle grill comprising: a pan having a central section and a raised perimeter; and at least three tabs extending outwardly from a center of the pan.

According to another aspect hereof, there is provided, in combination, a kettle grill and a heat diffuser in which: the kettle grill has a substantially hemispherical bottom section, at least one substantially horizontal surface within the bottom section, and a cooking grate; and the heat diffuser includes a pan having a central section and a raised perimeter, at least three planar surfaces extending outwardly from a center of the pan, the planar surfaces being positioned atop the horizontal surface on the grill, and the grate being positioned atop the heat diffuser.

The heat diffuser can optionally include a volume of water positioned in the pan atop the central section of the pan, the water being contained within the pan by the raised perimeter.

In addition, the heat diffuser can optionally comprise a metal material, and more particularly, the heat diffuser can comprise a metal such as stainless steel, aluminum, porcelain-coated steel, or the like.

The heat diffuser can also optionally include a cut-out section on the pan. The cut-out section allows a user to monitor the charcoal and add more charcoal fuel through the opening left by the cut-out section of the pan.

The outwardly-extending tabs on the heat diffuser each include a pair of opposed sides, and the opposed sides can optionally each include a downward-angled extension extending from the tab on each side.

According to another embodiment of the present invention, there is provided a heat diffuser for use with a kettle grill comprising: a pan having a raised perimeter that includes at least three corners, each of the corners having a bottom surface for mounting the heat diffuser within the kettle grill; the pan further having a lowered surface and a vertically-inclined wall, the vertically-inclined wall extends between the raised perimeter and the lowered surface, and the vertically-inclined wall extends entirely about a perimeter of the lowered surface; and a raised surface that is positioned along, and surrounded by, the lowered surface, the raised surface being elevated from the lowered surface, whereby a fluid can be placed in the pan to cover the lowered surface, but the raised surface is capable of being sufficiently elevated from the lowered surface such that the raised surface is not covered by the fluid.

Optionally, the heat diffuser is disposable and formed from aluminum. The pan may also optionally be rectangular and have four corners. Furthermore, the vertically-inclined wall may optionally include a plurality of aligned holes that extend in a direction parallel to the raised perimeter of the pan.

According to another aspect of the present invention, there is provided a method of converting a kettle grill into a meat smoker including the steps of: providing a kettle grill having a substantially hemispherical bottom section and a top lid, at least one substantially horizontal surface within the bottom section, and a cooking grate; providing a heat diffuser comprising a pan having a central section and a raised perimeter; positioning the pan within the bottom section of the kettle grill; and placing the cooking grate into the bottom section of the kettle grill, the cooking grate being positioned atop the horizontal surface and atop the heat diffuser.

This method can optionally further include the step of placing a volume of water into the pan.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

The purpose of the present invention is to provide the consumer a way to make better barbecue by converting popular backyard cooking grill into smokers by the use of the removable pan. The removable pan is significant in smoking food because it acts as a heat sink and also provides indirect cooking. The pan can be filled with a liquid, or alternatively left empty. The present invention is also a less expensive option than other smoking apparatuses in the marketplace. The removable pan provides a simple way to cook or smoke food at a desired temperature for up to 6-8 hours on one load of fuel.

Figure 1:
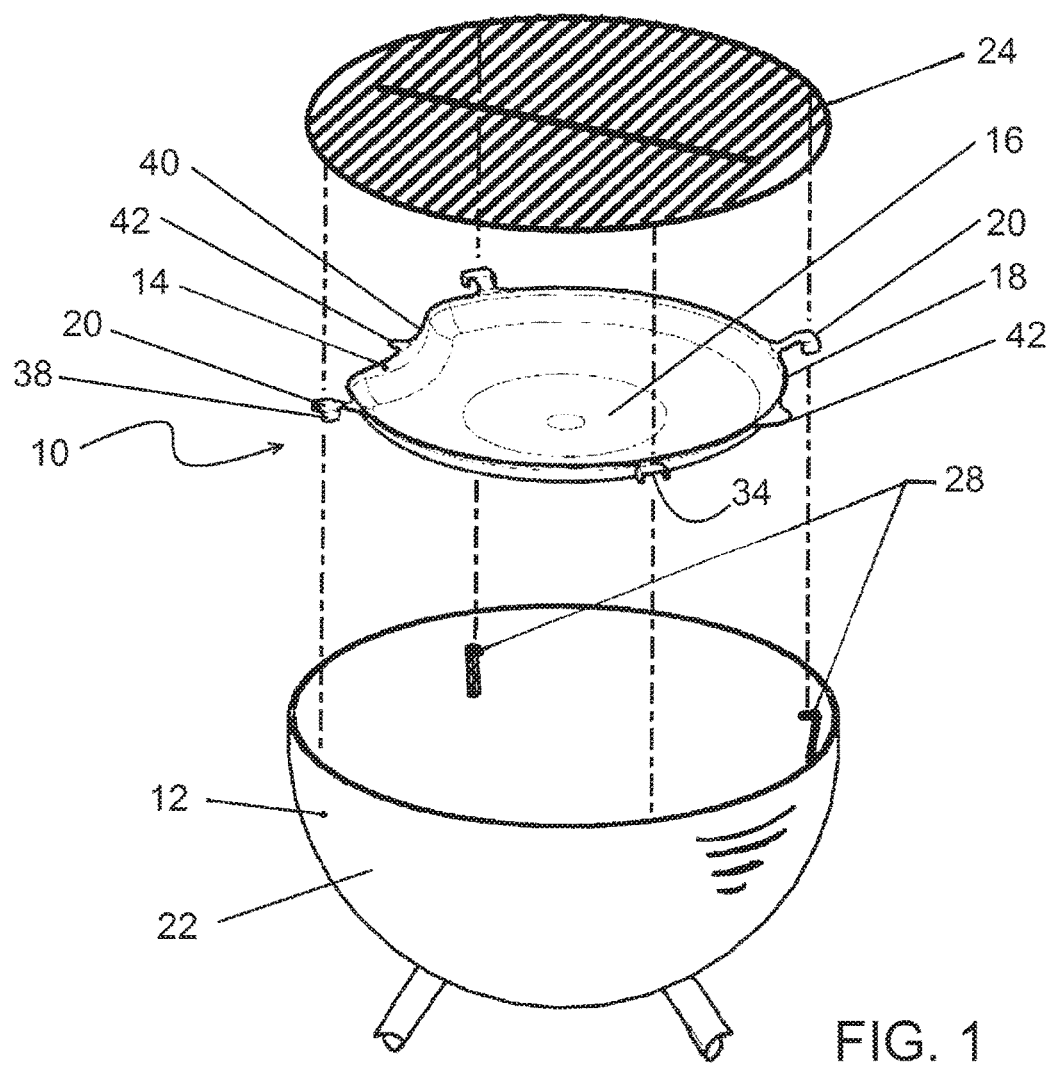
FIG. 1 is an exploded perspective view of a first embodiment of the present invention hereof, showing the kettle grill and the heat diffuser.
Figure 2:
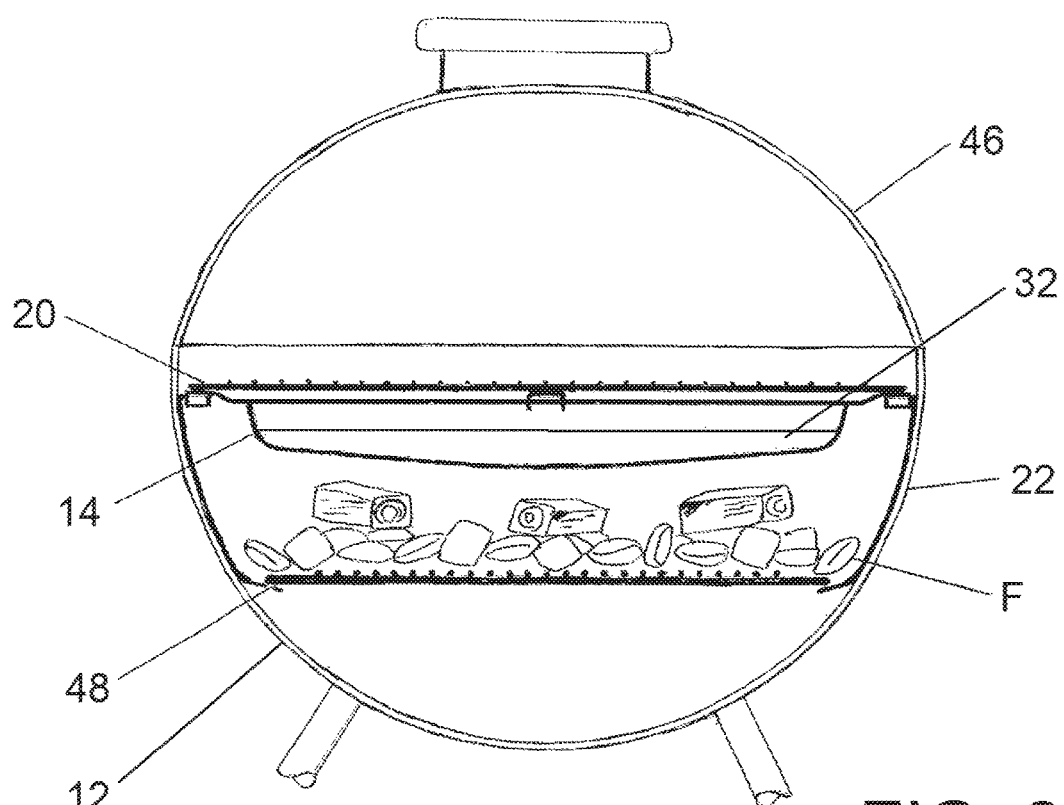
FIG. 2 is a side view of the first embodiment of the present invention, showing the kettle grill in phantom, and the heat diffuser installed within the kettle grill.
Figure 3:
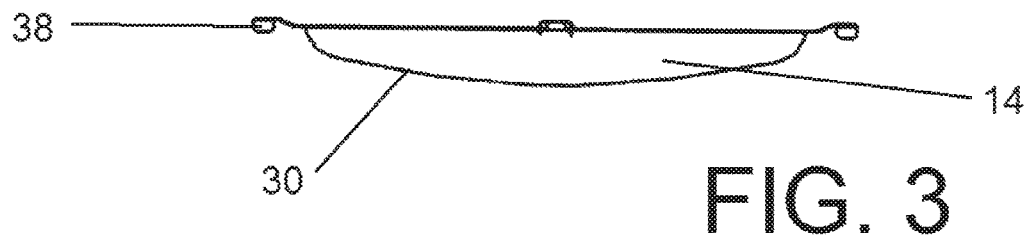
FIG. 3 is a side view of the first embodiment of the present invention.
Figure 4:
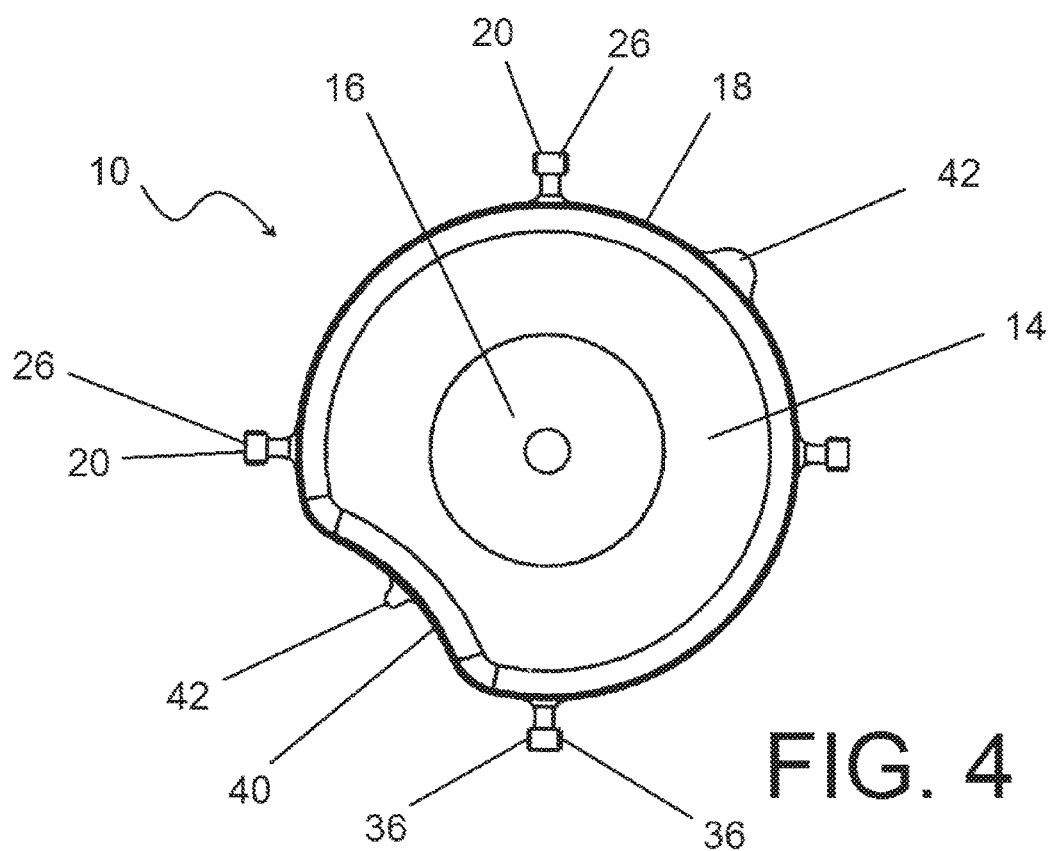
FIG. 4 is a top view of the first embodiment of the present invention.

In accordance with the present invention and as shown generally in FIG. 1, there is provided a heat diffuser 10 for use with a kettle grill 12 comprising: (a) a pan 14 having a central section 16 and a raised perimeter 18; and (b) at least three tabs 20 extending outwardly from a center of the pan 14.

According to another aspect hereof, there is provided, in combination, a kettle grill 12 and a heat diffuser 10 in which: (a) the kettle grill 12 has a substantially hemispherical bottom section 22, at least one substantially horizontal surface 28 within the bottom section 22, and a cooking grate 24; and (b) the heat diffuser 10 includes a pan 14 having a central section 16 and a raised perimeter 18, at least three planar surfaces 26 extending outwardly from a center of the pan 14, the planar surfaces 26 being positioned atop the horizontal surface 28 on the grill 12, and the cooking grate 24 being positioned atop the heat diffuser 10.

The pan 14 includes a central section 16 and a raised perimeter 18. The central section 16 and raised perimeter 18 are unitarily formed together by a rigid material having a thickness that is relatively thin with respect to the overall size of the pan 14, preferably about ¼" or less in thickness. In the embodiment shown in FIGS. 1-4, the outer circumferential shape of the pan 14 is generally circular. Preferably, the pan 14 covers approximately 70% or more of the cooking grate 24, thereby maximizing the amount of space for smoking meat. The central section 16 may be substantially flat and planar, but preferably it is somewhat downwardly concave in shape and is lowest near the middle, generally forming a bowl-like shape. This downwardly-concave shape provides a drop-down area, or open space, between the pan 14 and the meat on the cooking grate 24. The drop-down area allows the smoke to completely surround the meat, which helps provide a higher quality resulting product. The angular bottom surface 30 of the pan 14 lets the heat and smoke rise up and around the inside of the cooker more efficiently. The angular bottom surface 30 of the pan 14 also helps maintain steady temperatures within the grill 12.

The perimeter 18 of the pan 14 rises upwardly about the circumference of the pan 14. As mentioned above, this angle helps distribute heat and maintain steady temperatures within the grill 12. In addition, the resulting shape also allows the pan 14 to hold a volume of liquid 32 during use, which is described in greater detail below.

The heat diffuser 10 also includes at least three tabs 20 extending outwardly from a center of the pan 14. The tabs 20 preferably have a flat planar lower surface 34, and the tabs 20 are provided to rest on the grill 12, which is described in greater detail below. The tabs 20 include a pair of opposed sides 36, and preferably there is a downward-angled extension 38 extending from each side 36 of the tab 20. The downward-angled extensions 38 assist the tabs 20 in being seated correctly within the grill 12, ensuring that the heat diffuser 10 does not become dislodged during use and fall down onto the fuel F. In addition, it is possible that enough fuel F may be provided beneath the pan 14 so that the pan 14 cannot be fully seated down onto the support tabs 20 within the grill 12. In this case, the extensions 38 still enable the pan 14 to be positioned correctly.

The pan 14 can also optionally include an indentation, or cut-out section 40 along the outer circumferential perimeter 18 of the pan 14. The cut-out section 40 allows the user to view the fuel below the heat diffuser 10 to monitor its status, and also to add additional fuel through the cut-out section 40 while leaving the heat diffuser 10 in place.

Optionally, the pan 14 can include at least two flanges 42 to help the user in handling the removable pan 14. Preferably one flange 42 is provided near or within the indentation, or cut-out section 40, and another flange 42 is provided at the opposite side.

The heat diffuser 10, including the pan 14 and the tabs 20, comprise any suitable material that is tolerant of high temperatures, such as metal, ceramic, or the like. More preferably, the heat diffuser 10 comprises a metal material, such as stainless steel, aluminum, or porcelain-coated steel.

Although it is not necessary, the user may fill the pan 14 with a volume of a liquid 32, such as water, juice, beer, or any other type of liquid 32 as selected by the user. As understood by those having ordinary skill in the art, the liquid 32 increases the humidity within the grill 12, which can help keep the meat from drying out during smoking. The liquid 32 may also modify the flavor profile of the smoked meat by helping the smoke adhere to the meat, or by imparting a flavor from the liquid 32 (such as juice, beer, etc.) into the meat.

In addition, the liquid 32 acts as a heat sink and may provide a more even distribution of heat throughout the grill 12. The burning fuel, such as burning charcoal briquettes, imparts heat into the grill 12. The liquid 32 absorbs some of the heat, thus raising the temperature of the liquid 32. The temperature of the liquid 32 continues to rise until it reaches a boiling point, at which time the liquid 32 changes phase into a gas, and is then dissipated into the air. As understood in the world of physics, an additional amount of energy is required to effectuate the phase change from liquid to gas. Thus, the liquid 32 continues to absorb energy, and this continual absorption of heat energy into the liquid 32 (for first raising the temperature of the liquid 32, and then for changing the phase into a gas) helps maintain the temperature approximately around or just above the boiling point of the liquid 32. For water (or a water-based liquid 32), this boiling point will be around 212° F., which helps maintain a fairly steady and consistent temperature of about 225°-250° F. within the grill 12.

Although the benefits from using the heat diffuser 10 with a liquid 32 are apparent from the discussion above, there may be reasons for a user to use the heat diffuser 10 without a liquid 32. For example, some people like their smoked meat to have a more crisp, or crunchy, outer surface to it, and this can be better accomplished by not placing a liquid 32 in the heat diffuser 10. In this case, the heat diffuser 10 still has significant value in adapting the grill 12 into a meat smoker because the heat diffuser 10 diffuses the direct heat from the burning fuel, which still provides indirect heating to the meat. The meat could become irreparably burned or charred without the heat diffuser 10 in place.

Figure 5:
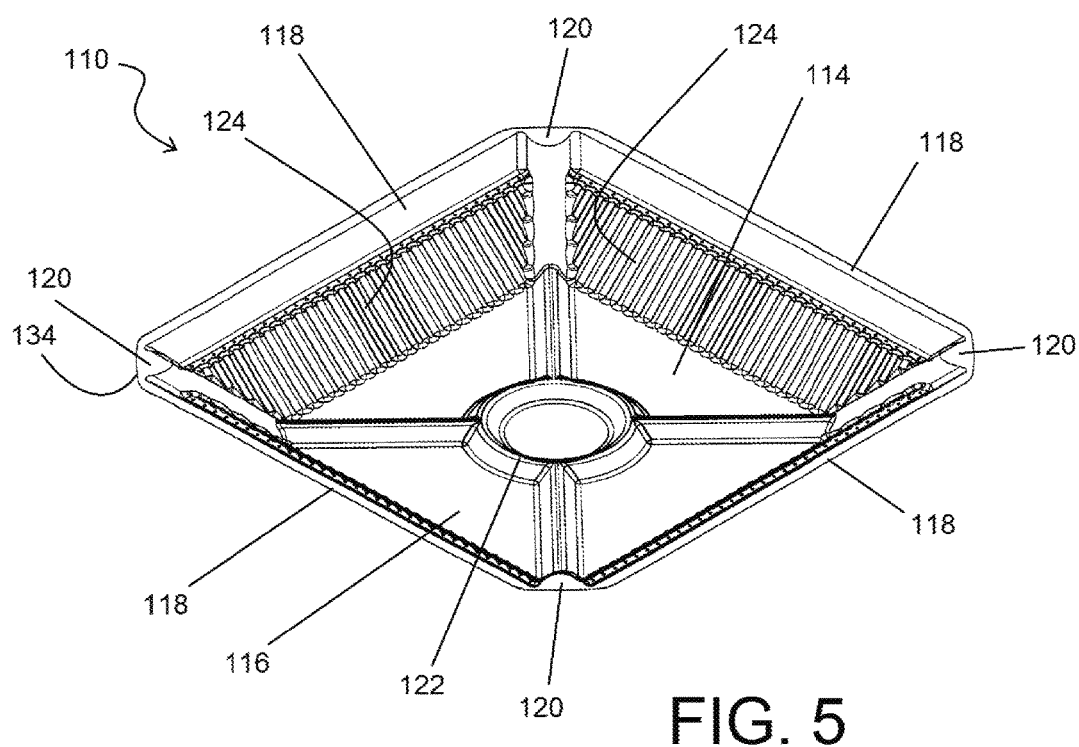
FIG. 5 is a perspective view of a second embodiment hereof.
Figure 6:
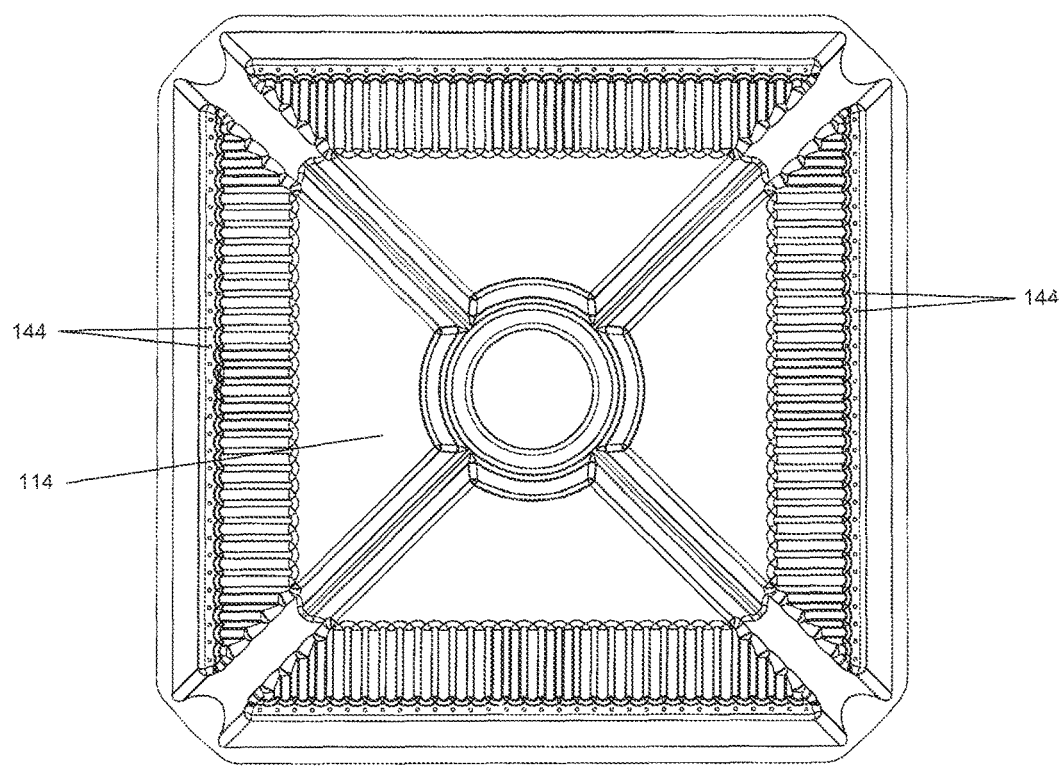
FIG. 6 is a top view of the second embodiment hereof.
Figure 7:
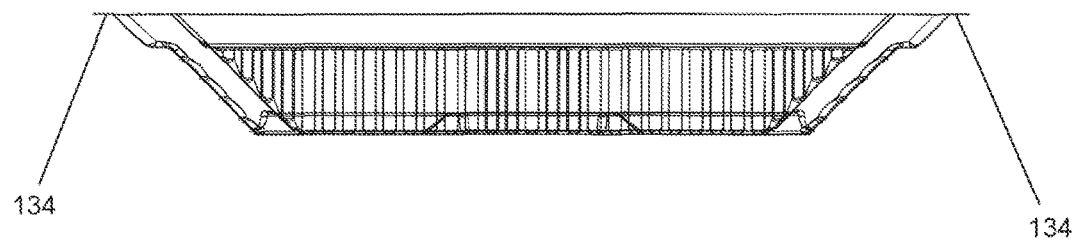
FIG. 7 is a side view of the second embodiment hereof.

A second embodiment of the heat diffuser 110 is shown in FIGS. 5-7. Although the overall shape and appearance of this heat diffuser 110 is quite different from that shown in FIGS. 3 and 4, the heat diffuser 110 functions in the same manner. This heat diffuser 110 has a lowered surface 116 on the pan 114, and a raised perimeter 118 extending about an outer edge of the pan 114. The pan 114 includes a vertically-inclined wall 124 which extends between the raised perimeter 118 and the lowered surface 116. The vertically-inclined wall 124 further extends entirely about the perimeter of the lowered surface 116 and extends on a vertical incline between the lowered surface 116 and the raised perimeter 118. As shown in the drawings, the vertically-inclined wall 124 is angled with respect to the lowered surface 116. The heat diffuser 110 is generally rectangular in shape, but just as with the first embodiment hereof, the heat diffuser 110 does not extend fully against the walls of the grill 12, thereby allowing some of the heat from the fuel to pass around the heat diffuser 110. The pan 114 and raised perimeter 118 include at least three corners 120. More preferably, the pan 114 is rectangular and the raised perimeter 118 has four corners 120. Preferably the heat diffuser may be disposable and formed from aluminum that is relatively thin and economically feasible for single use, or limited usage.

The heat diffuser 110 according to this embodiment does not have outwardly-extending tabs 20 that project outwardly from the pan 114. Instead, the corners 120 have a flat planar bottom surface 134 that allows the heat diffuser 110 to be placed within the grill 12. The bottom surfaces 134 are positioned atop the horizontal surfaces 28 within the grill. In addition, there is provided a raised surface 122 that is positioned, or located, along the lowered surface 116. The raised surface 122 is elevated from the lowered surface 116, and the raised surface 122 is positioned generally centrally on the lowered surface 116. It is apparent that, depending on the level of the liquid 32, the liquid 32 can cover the lowered surface 116 but will not cover the centrally-located raised surface 122. This embodiment of the heat diffuser 110 is envisioned to be a temporary, or disposable version of the heat diffuser 110. As mentioned above, this heat diffuser 110 is preferably formed from a material such as a thin aluminum. This heat diffuser 110 can optionally include a plurality of holes 144 that allow heat and smoke to pass therethrough, which helps expose the meat to the smoke to assist in the meat-smoking process and the quality of the finished product. As shown in FIGS. 5 and 6, there are a plurality of holes 144 that are positioned at the top of the vertically-inclined wall 124. The plurality of holes 144 are aligned with each other and extend generally about the entire perimeter of the pan 114. The holes 144 extend in a direction parallel to the raised perimeter 118 to which the holes are closest.

According to another aspect hereof, there is provided, in combination, a kettle grill 12 and the heat diffuser 10. As understood by those having ordinary skill in the art, a kettle grill 12 has a substantially hemispherical bottom section 22 and a removable hemispherical top lid 46.

The kettle grill 12 typically (although not necessarily) includes a lower charcoal grate 48 within the bottom section 22. Charcoal briquette fuel is placed on top of the charcoal grate 48. There is also provided an upper removable cooking grate 24 for supporting the meat or other food, such as vegetables). The grill 12 will include some type of support structure upon which the cooking grate 24 is positioned. Some grills include a plurality of support tabs 20 that extend inwardly from the inner wall of the bottom section 22, such as shown in FIG. 1. Other grill are known to have a horizontal ridge (not shown) built into the wall of the bottom section 22. This ridge typically extends about the entire perimeter 18 of the grill 12, and provides a support for both the cooking grate 24 and the lid of the grill 12.

In use, the fuel is added to the cooking grill 12 by placing unlit coals, followed by hot coals, atop the charcoal grate 48. The overall burn time of the fuel is increased by placing the fuel in this manner. After the charcoal grate 48 is loaded with fuel, the heat diffuser 10 is placed within the grill 12, atop the horizontal surfaces 28 (or ridge, when provided). The cooking grate 24 is placed atop the heat diffuser, with no modifications to the kettle grill 12. Food is then placed on the cooking grate 24, taking care not to hang food outside of the perimeter 18 of the pan 14. The lid 46 is then placed on the bottom section 22 of the cooking grill 12, and the grill's vents are adjusted to achieve the desired temperature.

In addition, there is also provided a method of converting a kettle grill 12 into a meat smoker including the steps of: (a) providing the kettle grill 12 having a substantially hemispherical bottom section 22 and a top lid 46, at least one substantially horizontal surface 28 within the bottom section 22, and a cooking grate 24; (b) providing a heat diffuser 10 comprising a pan 14 having a central section 16 and a raised perimeter 18; (c) positioning the pan 14 within the bottom section 22 of the kettle grill 12; and (d) placing the cooking grate 24 into the bottom section 22 of the kettle grill 12, the cooking grate 24 being positioned atop the horizontal surface 28 and atop the heat diffuser 10. The method of converting a kettle grill 12 into a meat smoker can further include the optional step of placing a volume of water 32 into the pan 14.

According to the invention described above, a removable pan, or heat diffuser, is provided for use with a cooking grill that converts a grill into a meat smoker.

What is claimed is:

1. In combination, a grill and a heat diffuser consisting of:
    the grill having a bottom section, four horizontal surfaces within the bottom section, and a cooking grate; and
    the heat diffuser includes a pan having a raised perimeter and four corners, each of the corners having a bottom surface for mounting the heat diffuser atop the horizontal surfaces within the grill;
    the pan further having a lowered surface and a vertically-inclined wall, the vertically-inclined wall extends between the raised perimeter and the lowered surface, and the vertically-inclined wall extends about the lowered surface; and
    the pan further having a raised surface that is positioned in a bottom of the pan and is surrounded by portions of the lowered surface, the raised surface extends vertically from a central region of the lowered surface upwardly toward the raised perimeter, and the lowered surface and the raised surface form a continuous surface that is free of openings along the bottom of the pan.

2. The combination of claim 1 wherein the heat diffuser is disposable and formed from aluminum.

3. The combination of claim 1 wherein the pan is rectangular and has four corners.

4. The combination of claim 1 wherein the vertically-inclined wall includes a plurality of holes, the holes being aligned with each other, and the aligned holes further being aligned in a direction parallel to the raised perimeter.

5. The combination of claim 2 wherein the pan is rectangular and has four corners.

6. The combination of claim 5 wherein the vertically-inclined wall includes a plurality of holes, the holes being aligned with each other, and the aligned holes further being aligned in a direction parallel to the raised perimeter.

* * * * *